United States Patent
Mesiah

[15] 3,668,204
[45] June 6, 1972

[54] CHLORINATION OF CYANURIC ACID

[72] Inventor: Raymond N. Mesiah, Somerset, N.J.

[73] Assignee: FMC Corporation, New York, N.Y.

[22] Filed: Aug. 21, 1970

[21] Appl. No.: 66,105

[52] U.S. Cl. .................................................260/248 C
[51] Int. Cl. ..........................................C07d 55/42
[58] Field of Search .......................................260/248 C

[56] References Cited

UNITED STATES PATENTS

| | | | |
|---|---|---|---|
| 2,913,460 | 11/1959 | Brown et al. | 260/248 |
| 3,184,458 | 5/1965 | Frazier | 260/248 |
| 3,534,033 | 10/1970 | Kagawa et al. | 260/248 |

*Primary Examiner*—John M. Ford
*Attorney*—Frank Ianno, Eugene G. Seems and Pauline Newman

[57] ABSTRACT

This invention provides a process for producing chloroisocyanuric acids by reacting cyanuric acid, sodium hypochlorite and chlorine at a temperature above zero° C. and preferably below 25° C., until the pH is between 1.7 and 3.5.

7 Claims, No Drawings

CHLORINATION OF CYANURIC ACID

BACKGROUND OF THE INVENTION

1. Field of the Invention

The chloroisocyanuric acids, sometimes referred to as the chlorocyanuric acids, are chemicals having many known uses. This invention provides a novel process for chlorinating cyanuric acid to produce these useful chemicals more safely and economically than is achieved by prior processes.

2. Description of the Prior Art

Dichloroisocyanuric acid and trichloroisocyanuric acid have been produced by mixing cyanuric acid with sodium hydroxide and then chlorinating the mixture by the addition of chlorine gas. Specifically, dichloroisocyanuric acid has been produced by mixing cyanuric acid with sodium hydroxide at a 1 to 2 mole ratio of cyanuric acid to sodium hydroxide, and then chlorinating the mixture by the addition of chlorine gas until the pH is between 1.7 and 3.5. After chlorination, the slurry is filtered and the dichloroisocyanuric acid filter cake is washed and dried.

Mixing of cyanuric acid with sodium hydroxide to produce disodium cyanurate, and reacting the later with chlorine is exothermic and produces a slurry from which large quantities of heat must be removed. Removing this heat presents difficult process engineering problems when the process is operated continuously to produce commercial quantities of product. Because of the nature of the slurry involved, heat exchangers used to control temperature in the reactor often plug during operation and require numerous shutdowns for cleaning. During these shutdowns, some of the cyanuric acid present in the slurry hydrolyzes forming ammonia and carbon dioxide. The presence of ammonia in the slurry cannot be permitted because it leads to formation of highly explosive nitrogen trichloride during subsequent chlorination. As a result, all of the slurry must be discarded if a prolonged shutdown (several hours) takes place, and such discarding of reactants and products represents not only an undue economical loss, but also a difficult disposal problem.

These problems are aggravated by the tendency of the slurry to decompose if its temperature rises above 25° C. Efficient cooling of the exothermic chlorination reaction is highly desirable and the heat exchanges must be kept very clean in order that these will function adequately. Since the slurry tends to foul and plug the heat exchangers, it is almost impossible to keep the heat exchangers sufficiently clean without repeated shutdowns for cleaning and in turn this necessitates the uneconomical discarding of slurry that is present in the heat exchangers and reactor during shutdown.

Another disadvantage associated with this prior art process is the expensive metering equipment or proportioning procedures that are required to control the mole ratio of cyanuric acid and sodium hydroxide within the narrow mole ratio which is required if a chlorinated product having the desired chlorine content is to be produced.

SUMMARY OF THE INVENTION

Chloroisocyanuric acids, especially very pure dichloroisocyanuric and trichloroisocyanuric acids, are produced by the process of this invention without heat removal and shutdown problems associated with the prior art process. The process of this invention comprises reacting cyanuric acid, sodium hypochlorite and chlorine at a temperature above 0° C and preferably below about 25° C, until the pH is between about 1.7 and about 3.5, and preferably between 2.5 and 3.5. The degree of chlorination of the cyanuric acid can be precisely controlled by adjusting the ratio of cyanuric acid to sodium hypochlorite. This ratio can be adjusted very accurately and simply to a predetermined value by mixing the components to a specific pH.

DETAILED DESCRIPTION OF THE INVENTION

This invention provides a novel process for producing chloroisocyanuric acids from cyanuric acid, sodium hypochlorite and chlorine. The sodium hypochlorite reactant is normally produced by chlorinating sodium hydroxide. Most of the heat of neutralization of the sodium hydroxide evolves during this chlorination of the sodium hydroxide. This heat can be easily removed because the sodium hypochlorite product is in solution and heat exchangers can be operated efficiently and without a plugging problem of the kind associated with the prior art process of chlorinating sodium cyanurate; a process which leads to formulation of solids in the reactor mixture.

The sodium hypochlorite, cyanuric acid and chlorine are reacted until the pH is between about 1.7 and about 3.5. The resulting slurry contains the chlorinated cyanuric acid product which can be filtered out and washed. Significantly, much less heat is generated during this reaction than is *generated* when di or tri sodium cyanurate is chlorinated with chlorine to produce the same end products.

The ratio of cyanuric acid to sodium hypochlorite controls the degree of chlorination of the cyanuric acid. Dichloroisocyanuric acid having an available chlorine content very close to theoretical value of 71.6 percent is produced when the ratio of cyanuric acid to sodium hypochlorite is about a 1 to 1 mole ratio. When this mole ratio is less than 1 to 1 the yield of dichloroisocyanuric acid decreases and a mixture of cyanuric acid and dichloroisocyanuric acid is produced which may be desirable for certain uses. When this ratio is between 1 to 1 and 1 to 1.7, a mixture of dichloroisocyanuric acid and trichloroisocyanuric acid is produced which may be desirable for certain uses. When this mole ratio is about 1 to 1.7, trichloroisocyanuric acid having an available chlorine content of close to the theoretical 91.5% is produced. When the mole ratio is above 1. to 1.7 there is an excess of sodium hypochlorite, which is wasteful but otherwise does not interfere with the production of trichloroisocyanuric acid.

The theoretical chemical equations for the production of dichloroisocyanuric acid and trichloroisocyanuric acid according to my invention are:

1. cyanuric acid + NaOCl + Cl$_2$ → dichloroisocyanuric acid + NaCl + H$_2$O
2. cyanuric acid + 1.5 NaOCl + 1.5 Cl$_2$ → trichloroisocyanuric acid + 1.5 NaCl + 1.5 H$_2$O Although the theoretical quantity required to produce trichloroisocyanuric acid is 1.5 moles of sodium hypochlorite, I have found that much better yields are obtained by using a slight excess (1.7) of sodium hypochlorite.

When the chlorine is added and reacted with the cyanuric acid and sodium hypochlorite until the pH is between 1.7 and 3.5, high yields are obtained. Use of a greater amount of chlorine (pH less than 1.7) results in an excess of chlorine which is wasteful but does not otherwise interfere with the process. When insufficient chlorine is present, the yield decreases and the process becomes less economical.

The process of this invention can be practiced either batchwise or continuously and by combining the reactants in several different ways, since the sequence for combining the reactants is not critical. However, preferably the cyanuric acid and sodium hypochlorite are first mixed at a mole ratio depending upon the product desired, and then the mixture is chlorinated with chlorine until a pH of between 2.5 and 3.5 is obtained. With this preferred sequence of practicing this invention, dichloroisocyanuric acid is produced when the mole ratio is about 1 to 1. When the cyanuric acid and sodium hypochlorite are mixed in a proportion such that the pH of the mixture is between 8.4 and 9.0 the preferred mole ratio of cyanuric acid to sodium hypochlorite of about 1 to 1 is obtained if the sodium hypochlorite does not contain much caustic, that is the pH of the sodium hypochlorite must be between 9 and 12. Therefore, this preferred mole ratio of about 1 to 1 can be accurately controlled by adjusting the addition of one component (e.g., cyanuric acid) in response to the pH of the mixture so as to maintain the pH of the cyanuric acid/sodium hypochlorite mixture between 8.4 and 9.0. This relationship between pH and preferred mole ratio gives the process of this invention the capability of economically producing very pure dichloroisocyanuric acid in commercial quantities without the expensive metering equipment or proportioning procedures previously required. This mole ratio of 1 to 1 is also the preferred starting ratio for producing trichloroisocyanuric acid, with the required additional sodium hypochlorite being added to raise the mole ratio to 1 to 1.7 during chlorination (see example 5.)

The operating temperature of the chlorination process must be above 0° C, and preferably below about 25° C. The particularly preferred operating temperature is about 15° C. When the temperature is permitted to rise much above 25° C, decomposition of cyanuric acid begins to take place which decreases the efficiency but does not otherwise interfere with the process.

The following examples are provided by way of illustration only, and are not intended to limit the scope of the invention.

EXAMPLE 1

The equipment used consisted of two reactors each equipped with a mechanical stirrer, pH electrodes, a thermometer and an overflow port positioned to give a working volume for each reactor of 600 ml. Each reactor was placed in an ice bath with the overflow from the first reactor directed into the second reactor. A 10.86 weight percent aqueous sodium hypochlorite solution (NaOCl) was prepared by chlorinating an aqueous sodium hydroxide solution to a pH of 10.5.

A cyanuric acid slurry was prepared containing 313 grams of cyanuric acid in 1,689 grams of water. The cyanuric acid slurry was pumped into the first reactor at the rate of about 55 ml/minute. The sodium hypochlorite solution was added simultaneously with the cyanuric acid slurry. The pH of the contents of the first reactor was continuously monitored and the rate of sodium hypochlorite addition was adjusted so as to maintain the pH of the contents of the first reactor between 8.80 and 8.95. This corresponds to a cyanuric acid to sodium hypochlorite mole ratio of about 1 to 1. The resulting mixture in the first reactor overflowed into the second reactor which initially contained 300 ml of water. The pH of the contents of the second reactor was continuously monitored and chlorine gas was added at a rate such that the pH of the contents of the second reactor was maintained between 3.0 and 3.4. The temperature of the reaction mixture in both reactors was maintained at between 14° and 16° C. The slurry that overflowed from the second reactor was filtered and the solid product collected.

After all of the cyanuric acid feed slurry had been added to the first reactor, the addition of sodium hypochlorite was stopped and the contents of the first reactor was chlorinated to a pH of 3.0 and 3.4. The reaction mixtures remaining in both reactors were filtered and the resulting filter cakes were washed with two 400 gram portions of water. The filter cakes together weighed 418 grams after they were dried, which represents a 87.1 percent yield based upon the amount of cyanuric acid used. The dried filter cake analyzed 71.4 percent available chlorine which indicates very pure dichloroisocyanuric acid (Theory for pure dichloroisocyanuric acid is 71.6 percent available chlorine). A total of 182 grams (2.58 moles) of sodium hypochlorite was used which gives a cyanuric acid to sodium hypochlorite mole ratio of 1 to 1.06. This demonstrates how accurately the mole ratio can be controlled by regulating the pH of the mixture of cyanuric acid and sodium hypochlorite.

EXAMPLE 2

The same procedure was used as in Example 1 except that the rate of addition of sodium hypochlorite was decreased so as to maintain the pH of the contents of the first reactor between 7.8 and 7.9. This gave a cyanuric acid to sodium hypochlorite mole ratio of 1 to 0.95. The dried filter cake analyzed 70.6 percent available chlorine which again is very close to theory for dichloroisocyanuric acid, but showed the presence of some unchlorinated cyanuric acid. The yield decreased from 87.1 percent to 71.4%.

EXAMPLE 3

The same procedure was used as in Example 1 except that the rate of addition of sodium hypochlorite was increased so as to maintain the pH of the contents of the first reactor between 9.1 and 9.3. This gave a cyanuric acid to sodium hypochlorite mole ratio of 1 to 1.11. The dried filter cake analyzed 72.9 percent available chlorine, which indicates that a mixture of dichloroisocyanuric acid and trichloroisocyanuric acid was produced. The product yield was 86.3 percent.

EXAMPLE 4

The same procedure was used as in Example 1 except that the rate of addition of sodium hypochlorite was increased so that the mole ratio of cyanuric acid to sodium hypochlorite was about 1 to 1.7 (the pH was about 10.1). The rate of introduction of chlorine into the second reactor was adjusted so that the pH of the contents of the second reactor was between 2.5 and 3.5. The dried filter cake analyzed 90.9 percent available chlorine (theory for trichloroisocyanuric acid is 91.5 percent.) The product yield of trichloroisocyanuric acid was 80.2 percent.

EXAMPLE 5

A feed solution was prepared containing 1.0 gram mole of cyanuric acid and 1.03 gram moles of sodium hypochlorite in 1,200 grams of water. A second feed solution was prepared containing 0.67 gram moles of sodium hypochlorite as an 11.8% aqueous solution. The two feed solutions were simultaneously fed into a reactor at a proportion such that the mole ratio of cyanuric acid to sodium hypochlorite was 1.0 to 1.7. At the same time gaseous chlorine was continuously added at a rate such as to maintain the pH of the contents of the reactor between 2.5 and 3.5. The resulting slurry was filtered, washed with water and dried. The yield of trichloroisocyanuric acid was 89.5 percent (208 grams) and analyzed 91.5 percent available chlorine. (Theory for pure trichloroisocyanuric acid is 91.5 percent).

I claim:

1. A process of producing chloroisocyanuric acids, comprising reacting cyanuric acid, sodium hypochlorite and chlorine at a temperature above 0° C until the pH is between 1.7 and 3.5.

2. The process of claim 1 in which the cyanuric acid and the sodium hypochlorite are continuously combined and then continuously chlorinated at a pH between 2.5 and 3.5 and a temperature of 14° to 16° C.

3. The process of claim 1 in which the cyanuric acid and sodium hypochlorite are present in a mole ratio of cyanuric acid to sodium hypochlorite of about 1 to 1.7 and trichloroisocyanuric acid is produced.

4. The process of claim 1 in which the cyanuric acid and sodium hypochlorite are initially present in a mole ratio of cyanuric acid to sodium hypochlorite of about 1 to 1 and then adding an amount of sodium hypochlorite during the reacting with chlorine such that the resulting mole ratio of the cyanuric acid to the sodium hypochlorite is about 1 to 1.7.

5. The process of claim 4 in which the initial mole ratio of cyanuric acid to sodium hypochlorite of about 1 to 1 is obtained by combining sodium hypochlorite and cyanuric acid such that the pH of the combination is between 8.0 and 9.0.

6. The process of claim 1 in which the cyanuric acid and sodium hypochlorite are present in a mole ratio of cyanuric acid to sodium hypochlorite of about 1 to 1, and dichloroisocyanuric acid is produced.

7. The process of claim 6 in which the mole ratio of cyanuric acid to sodium hypochlorite of about 1 to 1 is obtained by combining sodium hypochlorite and cyanuric acid such that the pH of the combination is between 8.0 and 9.0 and then reacting the combination with chlorine until the pH is between 1.7 and 3.5.

* * * * *